(12) United States Patent
Patberg et al.

(10) Patent No.: US 9,061,712 B2
(45) Date of Patent: Jun. 23, 2015

(54) UNDERSTRUCTURE FOR A VEHICLE (71) Applicants: Lothar Patberg, Moers (DE); Andreas Keutz, Düsseldorf (DE); Andreas Breidenbach, Brühl (DE)

(72) Inventors: Lothar Patberg, Moers (DE); Andreas Keutz, Düsseldorf (DE); Andreas Breidenbach, Brühl (DE)

(73) Assignee: ThyssenKrupp Steel Europe AG, Duisburg (DE)

(*) Notice: Subject to any disclaimer, the term of this patent is extended or adjusted under 35 U.S.C. 154(b) by 0 days.

(21) Appl. No.: 14/148,280

(22) Filed: Jan. 6, 2014

(65) Prior Publication Data
US 2014/0117716 A1    May 1, 2014

Related U.S. Application Data (63) Continuation of application No. PCT/EP2012/062343, filed on Jun. 26, 2012.

(30) Foreign Application Priority Data

Jul. 8, 2011 (DE) .......................... 10 2011 051 698

(51) Int. Cl.
*B62D 21/15* (2006.01)
*B62D 1/04* (2006.01)
*B60K 1/04* (2006.01)

(52) U.S. Cl.
CPC .............. *B62D 21/15* (2013.01); *B62D 21/157* (2013.01); *B62D 1/04* (2013.01); *B60K 2001/0438* (2013.01); *B60K 2001/0472* (2013.01); *B60Y 2306/01* (2013.01)

(58) Field of Classification Search
CPC ........ B62D 21/15; B62D 21/157; B60K 1/04; B60K 2001/0438; B60K 2001/0472; B60Y 2306/01

USPC ........... 296/193.07, 187.08, 203.01, 204, 205
See application file for complete search history.

(56) References Cited

U.S. PATENT DOCUMENTS

| 4,174,014 A | 11/1979 | Bjorksten | |
| 5,381,871 A * | 1/1995 | Ohta | .............................. 180/296 |
| 5,558,949 A * | 9/1996 | Iwatsuki et al. | ................. 429/99 |
| 7,237,829 B2 * | 7/2007 | Latimer et al. | ........... 296/187.11 |
| 7,270,202 B2 | 9/2007 | Kondo | |
| 2004/0104602 A1 * | 6/2004 | Cardimen et al. | ............ 296/204 |
| 2006/0027406 A1 | 2/2006 | Borroni-Bird et al. | |
| 2010/0237659 A1 * | 9/2010 | Ishigame et al. | .............. 296/204 |

FOREIGN PATENT DOCUMENTS

| DE | 100 44 740 A1 | 3/2002 |
| DE | 102 39 500 A1 | 9/2003 |

(Continued)

*Primary Examiner* — Jason S Morrow
*Assistant Examiner* — E Turner Hicks
(74) *Attorney, Agent, or Firm* — Reinhart Boerner Van Deuren P.C.

(57) ABSTRACT

The present invention relates to a floor structure for a motor vehicle with accommodating means for at least two energy storage modules, wherein the accommodating means comprise at least two longitudinal members and at least two cross members. In addition the present invention relates to the use of such a floor structure in a vehicle with an electric and/or internal combustion engine. The technical problem of providing a floor structure that in the event of accidents, in particular side impacts, improves the protection of the batteries in floor structures of vehicles without adversely affecting the weight or the costs, is solved in that the accommodating means have at least one deformation zone with defined deformation behavior between the energy storage modules.

20 Claims, 6 Drawing Sheets

(56) References Cited

FOREIGN PATENT DOCUMENTS

| JP | 07081625 A | | 3/1995 |
| JP | 07081625 A | * | 3/1995 |
| JP | 07-117726 A | | 5/1995 |
| KR | 10 2009 006 990 A1 | | 8/2010 |
| WO | WO 2004/070860 A1 | | 8/2004 |
| WO | WO 2012/063393 A1 | | 5/2012 |
| WO | WO 2012/086297 A1 | | 6/2012 |

* cited by examiner

UNDERSTRUCTURE FOR A VEHICLE

CROSS-REFERENCE TO RELATED PATENT APPLICATIONS

This patent application is a continuation of PCT/EP2012/062343, filed Jun. 26, 2012, which claims priority to German Application No. 102011051698.0, filed Jun. 8, 2011, the entire teachings and disclosure of which are incorporated herein by reference thereto.

FIELD OF THE INVENTION

The present invention relates to a floor structure for a vehicle with accommodating means for at least two energy storage modules, wherein the accommodating means comprise at least two longitudinal members and at least two cross members. The present invention furthermore relates to the use of such a floor structure in a vehicle with an electric and/or internal combustion engine.

BACKGROUND OF THE INVENTION

Floor structures for motor vehicles of the type mentioned in the introduction are know from the prior art. Since the instantaneous average energy density of energy storage modules such as batteries is significantly less than that of conventional fuels such as petrol, energy storage modules used for example to drive electric vehicles require significantly more space than petrol. In order however not to have to limit the space in the vehicle or in the boot, these energy storage modules are frequently stored in the floor of vehicles. This also has the advantage that the centre of gravity of the vehicle is not too greatly affected.

Various arrangements of batteries in vehicle floors are known from the prior art. The problem here however is the accident behaviour of the vehicles in relation to the energy storage modules. Already simply due to the shape of vehicles, in the case of side impacts in particular only a very small amount of space is available for a side impact protection, for example in the form of a crumple zone or other additional elements that protect the energy storage modules. An effective protection of the energy storage modules is however absolutely essential, since on the one hand damage to the energy storage modules results in expensive replacement and repair costs, and on the other hand constitutes an environmental hazard if chemical substances for example from a damaged battery are released into the environment after an accident.

For this reason there is a need for an effective protection of the energy storage modules in the floor structure of vehicles so that the aforementioned disadvantages can be avoided. At the same time it must be borne in mind that such an improved protection must neither be at the expense of the weight or spatial requirements of the vehicle, nor should it involve additional costs.

Against this background the technical object of the present invention is to provide a floor structure that in the event of accidents, in particular side impacts, improves the protection of the energy storage modules in the floor structures of vehicles without adversely affecting the weight or the costs.

SUMMARY OF THE INVENTION

According to the first teaching of the invention, this object is achieved in that the accommodating means comprise at least one deformation zone with a defined deformation behaviour between the energy storage modules.

Due to the provision of deformation zones with a defined deformation behaviour between the energy storage modules and the accommodating regions for the energy storage modules, the accident behaviour is significantly improved. In the way the energy that in the event of an impact acts on the floor structure does not have to be absorbed exclusively in the edge regions, for example by deformations, but can in addition be specifically absorbed between the energy storage modules by means of deformation. Damage to the energy storage modules is thereby effectively avoided.

Preferably deformation zones with defined deformation behaviour are provided between all energy storage modules. In this way a maximum degree of energy absorption is achieved through the accommodating means, and thus an optimal accident behaviour and an optimal protection of all energy storage modules are ensured.

Since the deformation zones are provided between the energy storage modules, the space between the energy storage modules in the event of an accident can decrease without the energy storage modules being damaged. A possible deformation of the accommodating means can thus also take place in the spaces without damaging the energy storage modules.

Energy storage modules are understood to mean in particular batteries and accumulators for storing electrical energy, but also other forms of energy storage and conversion, such as for example fuel cells or hydrogen cells.

A deformation zone with a defined deformation behaviour is understood to be a zone that can preferentially absorb forces acting on the floor structure and that can receive and absorb particularly well, especially compared to the other structural elements, the energy of an impact for example.

The defined deformation behaviour can be achieved for example by material weaknesses such as crumple beads or material recesses. Regions of thinner or different, more easily deformable material can also be provided.

Suitable accommodating means for the energy storage modules include for example cross members, longitudinal members and side members. Such members are in particular those which the energy storage modules lie on or abut, or which delimit the accommodating region of the energy storage modules. Separate accommodating boxes may however also be provided. In particular the cross members and longitudinal members can form a framework that substantially surrounds the energy storage modules.

That the deformation zones with defined deformation behaviour should be arranged between the energy storage modules means that these zones can be provided on the one hand within the space that is formed by at least two spaced-apart energy storage modules. On the other hand the deformation zone can however also lie in a longitudinal extension of the space. This means that the deformation zones do not have to lie directly between the energy storage modules, but can for example also lie above or below the space.

The cross members and longitudinal members are in this connection preferably formed as hollow profiles. In this way a very good stability and thus a very good accident behaviour of the floor structure can be achieved despite the very low weight. In particular an optimal accident behaviour can be achieved by five cross members. These are preferably distributed substantially uniformly in the longitudinal direction.

According to a first embodiment of the floor structure according to the invention the floor structure comprises at least one, preferably for each energy storage module one, accommodating box.

The accommodating boxes make available defined accommodating regions for the individual energy storage modules. In this way the accident behaviour is furthermore improved, since the accommodating boxes on the one hand at least partially enclose and thereby protect the energy storage modules, and on the other hand improve the stability of the floor structure especially in the region of the energy storage modules. Also, the accommodating boxes being accommodating means can provide deformation zones.

An accommodating box preferably consists of a floor region and side walls and encloses the energy storage modules from below. In this way the energy storage modules can in particular easily be accessed from underneath, wherein by loosening the accommodating boxes from underneath the energy storage modules can be replaced as desired.

Due to the fact that one accommodating box is provided for each energy storage modules, individual accommodating boxes can also remain empty, and also only individual energy storage modules can be fixed in their respective accommodating region by the accommodating box. Finally, by virtue of the accommodating boxes the stability of the floor structure can be ensured even with individual defective energy storage modules.

In principle it is however also conceivable that more than one energy storage module is contained in an accommodating box. In this way the weight and the production expenditure and thus the costs for the floor structure can be reduced.

According to a further embodiment of the floor platform according to the invention the at least one accommodating box has embossed regions for stiffening purposes. In this way the stability and thus the accident behaviour and the protection of the energy storage modules can furthermore be improved. It is particularly preferred if a crosswise stiffening is provided in the floor region of the accommodating box. In principle all or also only individual accommodating boxes can have embossed regions for stiffening purposes.

It is furthermore preferred if the at least one accommodating box is connected to at least one cross member, preferably by means of at least one embossed part. By connecting an accommodating box to a cross member the accommodating box is connected in a simple way to the rest of the accommodating means of the floor structure. The cross member fulfils in this connection the function of a stiffening in order to improve in particular the side impact protection, and also the function of the fastening element for the accommodating boxes. Such a connection is advantageous especially when more than two accommodating boxes are provided, which extend in the longitudinal direction of the floor structure. The accommodating boxes can then be fastened to one or more cross members.

In order to improve the stability of the floor structure the accommodating boxes are preferably secured to two cross members.

It is particularly advantageous if deformation zones are provided on a cross member, on which the accommodating boxes are secured. In this way, due to the deformation zones it can be precisely determined how the spaces between the energy storage modules will reduce in size due to a force acting substantially along the cross member during a side impact.

The securement between an accommodating box and cross member can be accomplished in particular by embossed parts. These can be connected for example by welding to the accommodating boxes and provide accommodating regions for screw connections, in order then to screw the accommodating boxes to a cross member. In principle it is however also possible to provide other connections by positive engagement, frictional connection or material connection, such as welding, bonding, locking engagement or the like.

Preferably the accommodating boxes are fastened, in particular screwed, from the underneath to the floor structure. In this way easy access can be gained to the energy storage modules also in the vehicle by unscrewing the accommodating boxes from below.

It is furthermore advantageous if at least two accommodating boxes are provided and these have a substantially rectangular shape and extend parallel to the longitudinal members. In this way spaces are created in the longitudinal direction, i.e. parallel to the direction of travel, between the energy storage modules, so that deformation zones with defined deformation behaviour for an energy absorption in the transverse direction can be provided. Since as a rule enough protection for the energy storage modules is provided in the direction of travel by crumple zones in the engine compartment and rear compartment of the vehicle, due to this arrangement of the accommodating boxes and energy storage modules specifically the side impact protection for the energy storage modules is improved.

According to a next embodiment of the floor structure according to the invention the edges of the side walls of the accommodating boxes have flanges. In this way on the one hand the stability of the accommodating boxes can be further increased and thereby the accident behaviour can be improved. On the other hand, due to the flange regions a deformation zone with defined deformation behaviour can be provided in a simple manner between the energy storage modules. Preferably the flanges are bent substantially at right angles from the side wall. In this way adjacent accommodating boxes can be positioned with the flanges abutting and a deformation zone can thus be particularly effectively provided.

According to a next embodiment the floor structure additionally comprises at least one, preferably two sills. The sills running parallel to the longitudinal members increase the stability of the floor structure and in this way also improve the accident behaviour, in particular the side impact protection. The sills are preferably formed as hollow profiles so as to be able to combine an optimum stability with low weight and low material costs. The sills are connected for example by cross members to the floor structure. These do not have to run rectilinearly, but can also be bent or curved.

Preferably the at least one deformation zone with a defined deformation behaviour between the energy storage modules is provided by at least one cross member and/or by at least one accommodating box and/or by at least one longitudinal member. Thus, existing accommodating means of the floor structure are effectively utilised to improve the accident behaviour, without having to increase the weight of the floor structure or provide cost-intensive additional components.

If the energy storage modules are arranged so that a space is formed in the longitudinal direction, the cross members preferably comprise the deformation zones, whereas in the case of a space in the transverse direction the deformation zones can also be provided on the longitudinal members. In each case due to the accommodating boxes deformation zones can be provided directly between the energy storage modules.

According to the next embodiment of the floor structure according to the invention at least cross one member has in the region between a longitudinal member and a sill, a deformation zone with defined deformation behaviour. Thus, an additional region for a defined deformation is provided. Too high a loading of the deformation zones with defined deformation behaviour between the energy storage modules is thus avoided, since already at least some of the energy of an impact can be absorbed by the deformation zone with defined deformation behaviour on the cross member in the region between a longitudinal member and a sill. Also, these deformation zones can in particular be realised by means of crumple beads.

The expression "between a longitudinal member and a sill" is in turn understood to mean that the deformation zone can be provided within the space that is formed by sills and longitudinal members. The deformation zone can however also lie in a longitudinal extension of the space. This means that the deformation zone does not have to lie directly between a longitudinal member and sill, but can for example also lie above or below the space.

In a further advantageous embodiment the floor structure comprises at least one deformation element with defined deformation behaviour between a longitudinal member and sill. Due to a deformation element the stability and thus the accident behaviour in the case of side impacts can be significantly improved. Although an additional element is required, nevertheless in this way a large proportion of the energy of an impact can as a rule be absorbed in the region between a sill and longitudinal member. Such a deformation element with defined deformation behaviour can be produced from a hollow profile, which comprises crumple beads that preferentially deform. The deformation element can also have a harmonica-like structure, which under the action of a force is preferentially compressed along the deformation element.

According to a next embodiment the sills are connected by at least one cross member formed in one piece. In this way a high stability of the overall floor structure is achieved. The cross member formed in one piece can in particular also be connected directly to further longitudinal members. It is particularly advantageous if a cross member formed in one piece comprises deformation zones with defined deformation behaviour between a longitudinal member and a sill and/or between the energy storage modules. In this way a furthermore improved accident behaviour can be achieved. The at least one cross member formed in one piece is preferably formed as a hollow profile.

The longitudinal members can likewise be connected by at least one cross member formed in one piece. In this way a high rigidity of the floor structure, in particular in the transverse direction, is achieved. The cross member formed in one piece can in particular serve as accommodating means of the fastening of the energy storage modules or accommodating boxes. The at least one cross member formed in one piece is preferably formed as a hollow profile.

In a further embodiment at least one longitudinal member comprises a front and a rear longitudinal member element. Preferably two longitudinal members comprise respectively a front and a rear longitudinal member element. Due to the provision of longitudinal member elements, on the one hand an additional deformation region can be created in the longitudinal direction. In this way the accident behaviour is improved especially in the longitudinal direction. On the other hand, due to the separate longitudinal member elements a modular construction of the floor structure is achieved, so that this can be employed more flexibly. The longitudinal member elements can for example form the regions specifically adapted to a type of vehicle, so that a longitudinal member can be used for different types of vehicles.

The longitudinal member elements can be connected by connecting parts to the longitudinal member. A simple, flexible but stable connection of the longitudinal member elements to the longitudinal members can be produced by means of the connecting parts. The connecting parts can be formed in particular by bent parts. Thus, a complex structural shape can first of all be cut into a sheet, which is then bent at defined bending edges so as to provide a profile that can join longitudinal members and longitudinal member elements. A complex and stable structural part can be produced in a particularly simple manner with bent parts.

In addition cross members can also be joined to the floor structure via the connecting parts. In particular it is advantageous if the cross members connecting the sills are joined by means of the connecting parts to the longitudinal members and/or longitudinal member elements. In this way a stable connection of the cross member intersecting the longitudinal member or longitudinal member element is achieved.

According to a further the longitudinal member elements are formed geometrically substantially identically. This reduces the production costs and the manufacturing effort and expenditure, since a distinction does not have to be made between front and rear or left and right longitudinal member elements.

It is furthermore preferred if the longitudinal member elements are produced by U-O forming and shaping. In this way light but stable longitudinal member elements can be produced. The longitudinal member element can be welded to a closed profile by means of conventional welding or laser welding. Despite their low weight, longitudinal members produced in this way have a high stability and rigidity.

Finally, according to a second teaching of the invention it is advantageous to use a floor structure according to the invention in a motor vehicle with an electric and/internal combustion engine. A vehicle with an electric and/or internal combustion engine can thus be provided that has an excellent accident behaviour on account of the floor structure. Energy storage modules housed in the accommodating means of the floor structure are effectively protected against damage by impacts, in particular side impacts, without the production costs of the floor structure and its weight being adversely affected.

BRIEF DESCRIPTION OF THE DRAWINGS

The invention is described in more detail hereinafter with the aid of an exemplary embodiment illustrated in the drawings, in which.

DETAILED DESCRIPTION OF THE INVENTION

Figure 1:
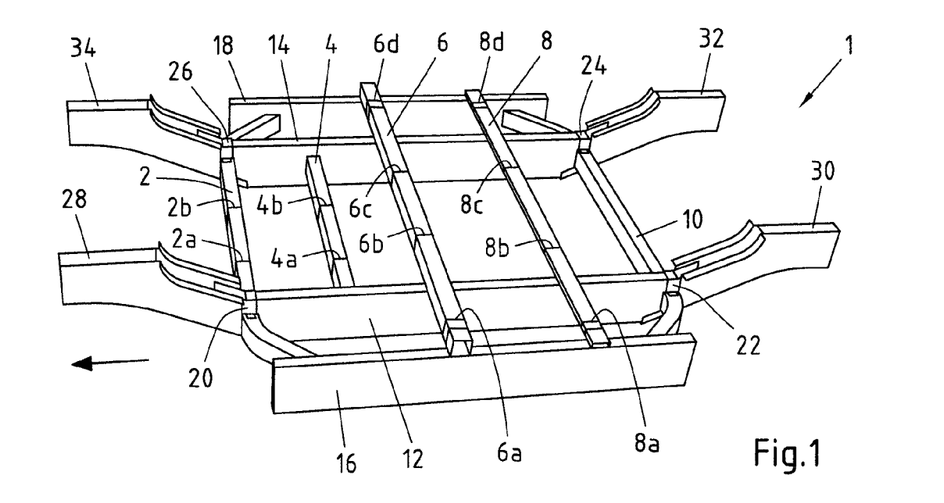
FIG. 1 shows an exemplary embodiment of a floor structure according to the invention for a vehicle without energy storage modules, in a perspective view from above.

FIG. 1 shows an embodiment of a floor structure 1 according to the invention for a vehicle without installed energy storage modules 62, 62', 62", in a perspective view from above. The direction of travel of the vehicle and the longitudinal direction is indicated by an arrow. The floor structure 1 has five cross members 2, 4, 6, 8, 10 and two longitudinal members 12, 14. The cross member 4 connects the longitudinal members 12, 14 to one another and is arranged between the longitudinal members 12, 14. In this connection the cross member 4 is formed in one piece. The cross members 6, 8 are arranged above the longitudinal members 12, 14 and connect to sills 16, 18 to one another. The sills 16, 18 are arranged parallel to the longitudinal members 12, 14 and provide additional protection against side impacts in the transverses direction. The cross members 6, 8 are also connected to the longitudinal members 12, 14. It is however also conceivable for the cross members 6, 8 to be arranged without being joined via the longitudinal members 12, 14.

The sills 16, 18 are additionally connected to one another via the cross members 2, 10. At the same time the cross members 2, 10 are connected by means of four connecting parts in the form of bent parts 20, 22, 24, 26 to the longitudinal members 12, 14 and also to front longitudinal member elements 28, 34 and rear longitudinal member elements, 30, 32. The cross members 2, 10 are in this connection formed rectilinearly in the region between the longitudinal members 12, 14 and are formed to vibrate respectively in the region between longitudinal members 12, 14 and sills, 16, 18. In contrast to the cross members 4, 6, 8 the cross members 2, 10 are formed of several parts, which allows more complex shapes. On the other hand a high degree of rigidity can be achieved with the cross members 4, 6, 8 formed in one piece. The longitudinal member elements 28, 30, 32, 34 are in this connection all formed identically for the sake of an efficient production.

Due to the illustrated connections between cross members 2, 4, 6, 8, 10, longitudinal members 12, 14 and sills 16, 18 a particularly stable floor structure is provided, which protects in particular the region between the cross members 2, 10 and the longitudinal members 12, 14.

The cross members and longitudinal members, longitudinal member elements and sills illustrated in FIG. 1 are formed as hollow profiles in order to ensure a sufficient stability combined with a low weight. The use of steels, magnesium materials or aluminium materials is advantageous in this connection.

In FIG. 1 it can also be seen that the cross members 2, 4, 6, 8 comprise deformation zones with defined deformation behaviour in the form of crumple beads 2a, 2b, 4a, 4b, 6a, 6b, 6c, 6d, 8a, 8b, 8c, 8d. The crumple beads 4a, 4b, 6b, 6c, 8b, 8c are arranged so that they are disposed between installable energy storage modules. The crumple beads 6a, 6d, 8a, 8d consist in this case of two adjacently lying crumple beads. It is of course also conceivable that only individual cross members also have only individual deformation zones with defined deformation behaviour. In addition it is of course possible for the cross member 10 to have deformation zones with defined deformation behaviour.

Figure 2A:
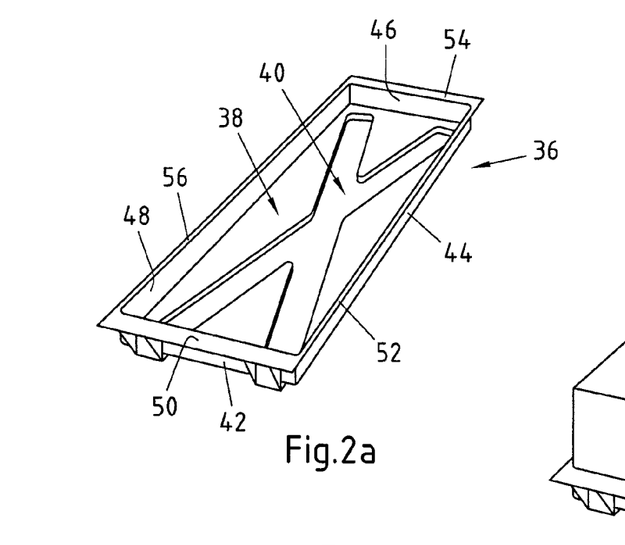
FIG. 2a-c show an exemplary embodiment of an accommodating box in various perspective views.

FIG. 2a now shows an example of an accommodating box 36 for the energy storage module 62. The accommodating box 36 comprises a longitudinal, rectangular floor region 38, which is adapted to the energy storage modules 62, 62', 62". In order to increase the stability the floor region 38 is provided with an embossed region in the form of a crosswise stiffening 40. The accommodating region for an energy storage module is furthermore bounded by substantially rectangularly arranged side walls 42, 44, 46, 48. The side walls 42, 44, 46, 48 furthermore have flanges 50, 52, 54, 56, which are also folded outwards substantially at right angles. By means of the flanges 50, 52, 54, 56, in particular the flanges 52, 56 on the longitudinal edges of the side walls 44, 48 of the accommodating box 36, deformations zones with specific deformation behaviour can be provided. The deformation behaviour can be determined by the size, length, angle and material of the flanges.

Figure 2B:
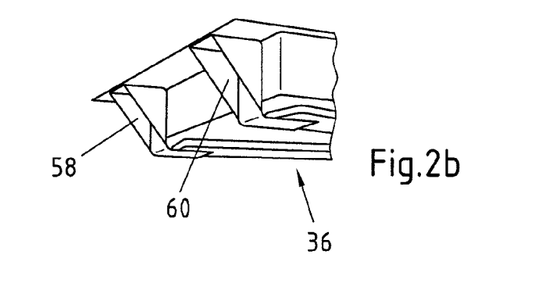

FIG. 2b shows the accommodating box 36 in an inclined perspective view from below. Embossed parts 58, 60 are connected to the accommodating box 36 by spot welds. By means of the embossed parts 58, 60 the accommodating boxes can be fixed, for example by means of screws, to cross members of longitudinal members of the floor structure 1.

Figure 2C:
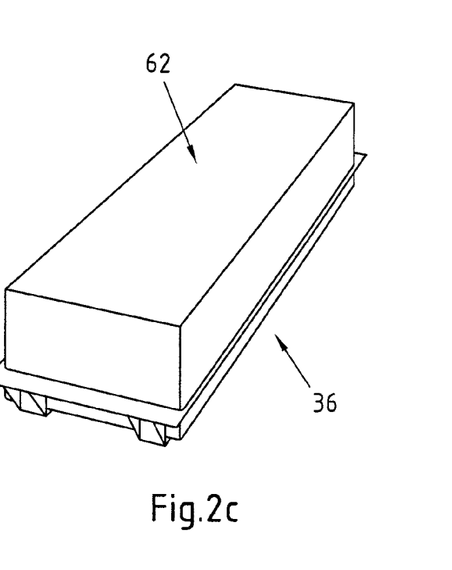

FIG. 2c shows the accommodating box of FIG. 2a with the inserted energy storage module 62. Since the accommodating box 36 is matched to the shape of the energy storage module 62, the possible movement of the energy storage module 62 is restricted. In order to prevent the energy storage module 62 slipping out over the side walls 42, 44, 46, 48, the energy storage module 62 can additionally be screwed to the accommodating box 36.

Figure 3:
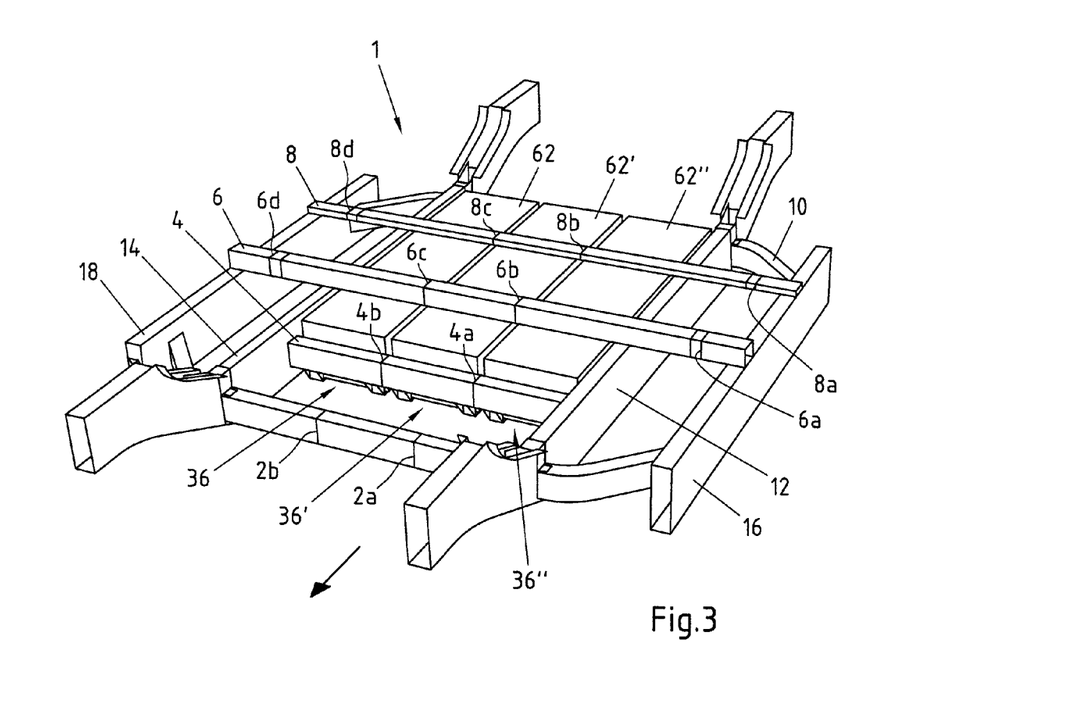
FIG. 3 shows the floor structure of FIG. 1 with three energy storage modules positioned in accommodating boxes, in a perspective view.

FIG. 3 shows in a perspective view the floor structure of FIG. 1 with three energy storage modules positioned in accommodating boxes. The direction of travel of the vehicle and longitudinal direction is indicated by an arrow. The accommodating boxes 36, 36', 36" are connected via embossed parts to the cross members 4, 10. In the transverse direction the energy storage modules 62, 62', 62" are first of all protected by the sills 16, 18 and the longitudinal members 12, 14 against side impacts. In this case the three energy storage modules 62, 62', 62" are arranged substantially parallel to the direction of travel, in order to produce an optimal accident behaviour by deformations zones 2a, 2b, 4a, 4b, 6b, 6c, 8b, 8c with defined deformation behaviour between the energy storage modules 62, 62', 62". Of course, more or fewer than three energy storage modules 62, 62' 62" can also be provided. In principle an arrangement transverse to the direction of travel is also conceivable, in order to achieve an improved protection of the energy storage modules 62, 62' 62" in the direction of travel. Also a combination of arrangements transverse and longitudinally to the direction of travel is conceivable.

The energy storage modules 62, 62', 62" are fixed in the upward direction by the cross members 6, 8. In this case however these are not firmly connected to the energy storage modules 62, 62', 62".

Figure 4:
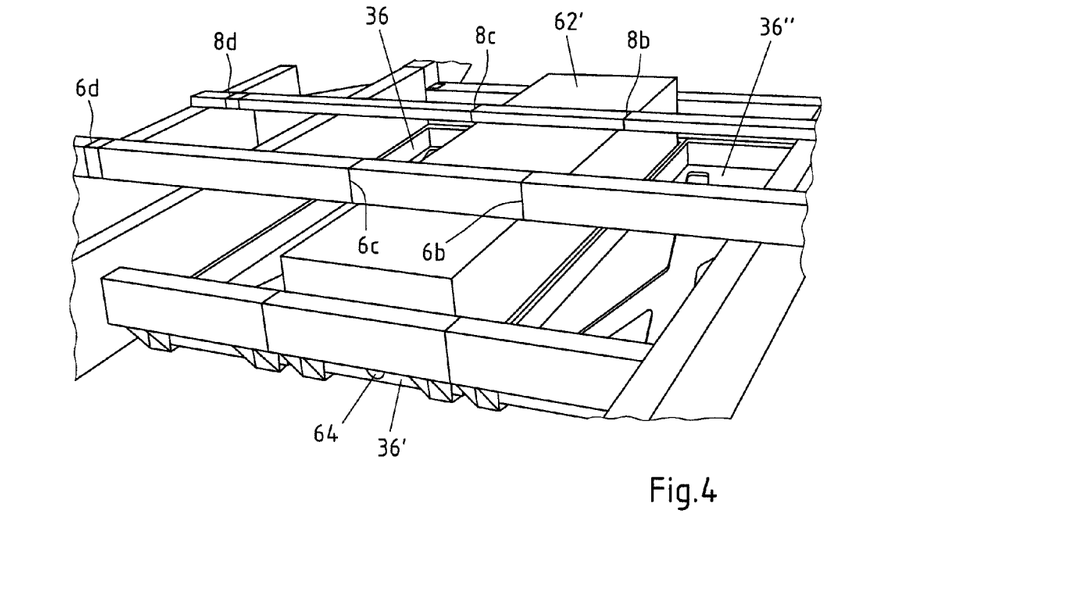
FIG. 4 shows the floor structure of FIG. 3 with only one energy storage module, in a perspective view.

FIG. 4 shows the floor structure 1 of FIG. 3 with only one energy storage module 62', in a perspective enlarged view. Even if fewer energy storage modules than possible are installed in the floor structure, the installed energy storage modules 62' are adequately fixed in position on account of the accommodating boxes 36' and are prevented for example from sliding backwards and forwards.

The energy storage module 62' has a connection facility 64 for electrical cable connections and lines for cooling purposes. The remaining energy storage modules 62, 62" obviously also have the same or similar connection facilities. Particularly advantageously the lines and cables can be guided at least partly through the interior of the cross members and longitudinal members 2, 4, 6, 8, 10, 12, 14 formed as hollow profiles.

Figure 5:
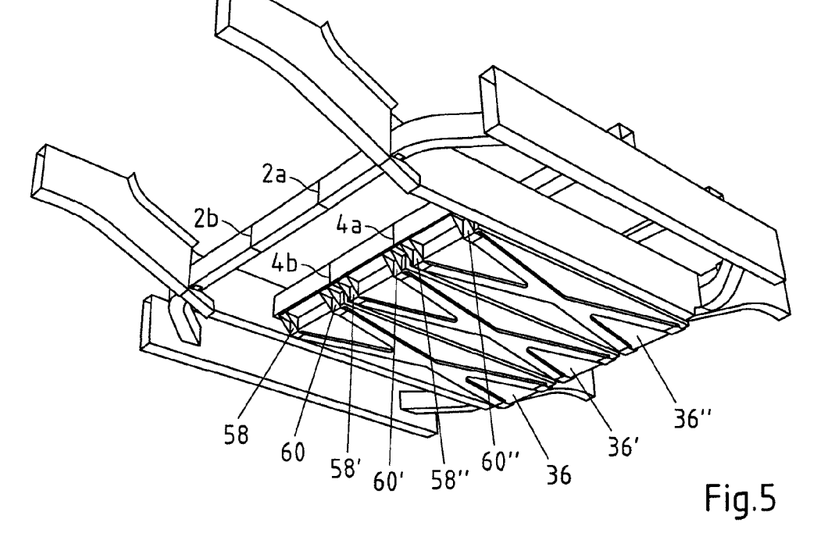
FIG. 5 shows the floor structure of FIG. 3 in a perspective view from below.

FIG. 5 shows the floor structure of FIG. 3 in a perspective view from below. Since the accommodating boxes 36, 36', 36" are spaced from the floor structure by means of the embossed parts 58, 60, 58', 60', 58", 60", the energy storage modules 62, 62', 62" can be accessed in a simple manner from underneath the vehicle. The energy storage modules 62, 62', 62" can thus be individually installed and removed quickly and easily.

Figure 6:
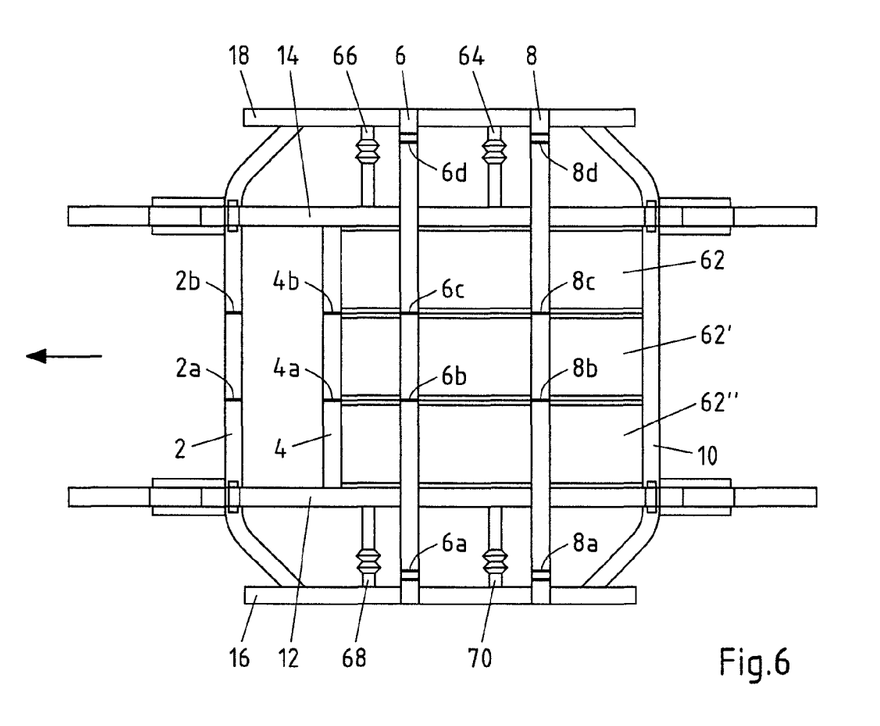
FIG. 6 shows the floor structure of FIG. 3 with additional deformation elements in plan view before a side impact.

FIG. 6 shows the floor structure of FIG. 3 with additional deformation elements 64, 66, 68, 70 in a plan view before a side impact. The direction of travel of the vehicle and longitudinal direction is indicated by an arrow. The deformation elements 64, 66 are arranged between the longitudinal member 14 and the sill 18, and are fastened thereto, while the deformation elements 68, 70 are arranged between the longitudinal member 12 and the sill 16 and are fastened thereto. Due to the partial harmonica-like structure of the deformation elements 64, 66, 68, 70 these have a defined deformation behaviour and can absorb the energy of an impact.

In FIG. 6 it can furthermore be seen that the cross members 4, 6, 8 comprise deformation zones with defined deformation behaviour in the form of crumple beads 2a, 2b, 4a, 4b, 6a, 6b, 6c, 6d, 8a, 8b, 8c, 8d. The crumple beads 4a, 6b, 8b are arranged between the energy storage modules 62", 62', and the crumple beads 4b, 6c, 8c are arranged between the energy storage modules 62', 62. The crumple beads 6a and 8a are arranged, like the deformation elements 68, 70, between the longitudinal member 12 and the sill 16, while the crumple beads 6d and 8d are arranged, like the deformation elements 64, 66, between the longitudinal member 14 and the sill 18. In addition the flanges of the accommodating boxes 36, 36' 36" can serve as deformation zones with defined deformation behaviour. The crumple beads 6a, 6d, 8a, 8d consist in this case of two adjacently lying crumple beads.

In the normal state, in other words without an accident having occurred, the crumple beads 4a, 4b, 6a, 6b, 6c, 6d, 8a, 8b, 8c, 8d and deformation elements 64, 66, 68, 70 are not deformed and the energy storage modules 62, 62', 62" are spaced from one another.

Figure 7:
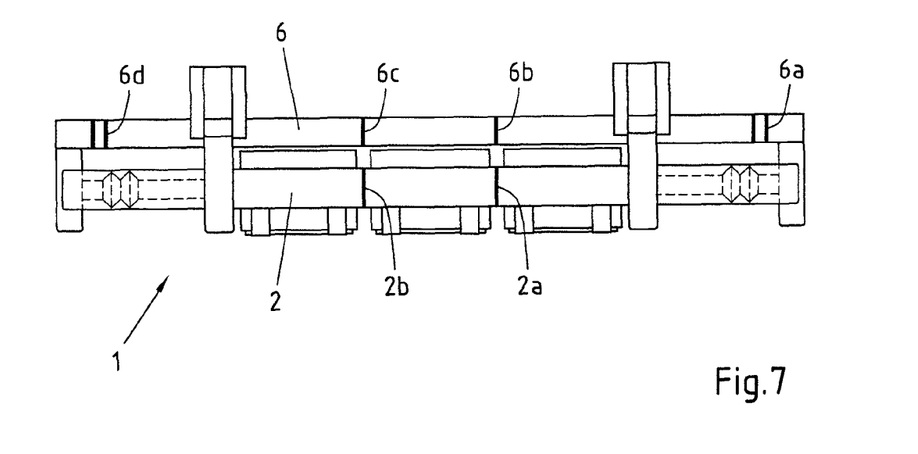
FIG. 7 shows the floor structure of FIG. 3 with additional deformation elements in a front view before a side impact.

FIG. 7 shows the floor structure of FIG. 1 with additional deformation elements 64, 66, 68, 70 in a front view looking against the direction of travel and also before a side impact. It can additionally be seen in this perspective view that also the cross member 2 has crumple beads 2a, 2b. The cross member 10 can also have such crumple beads.

Figure 8:
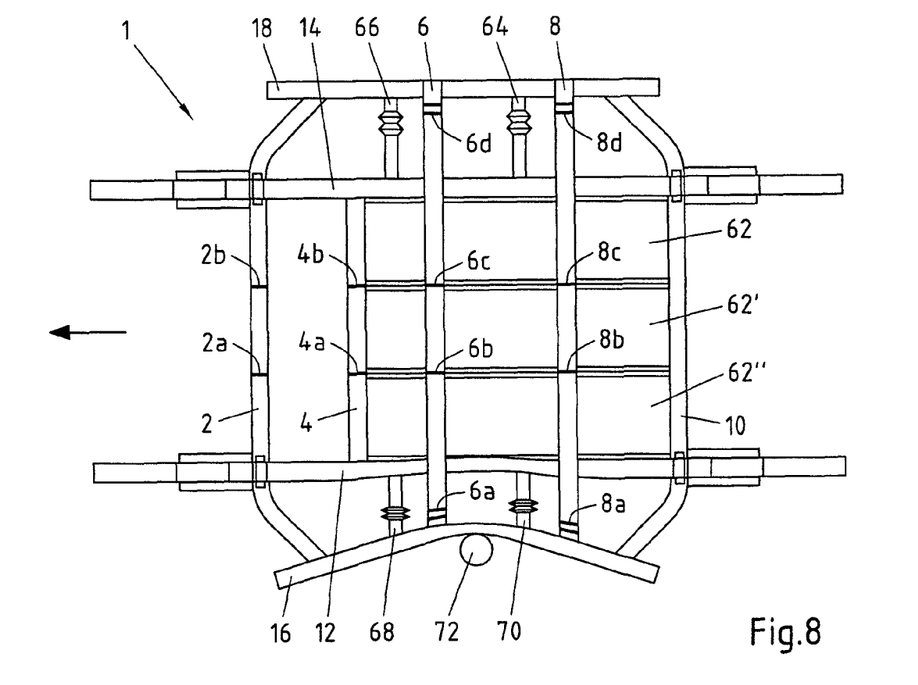
FIG. 8 shows the floor structure of FIG. 3 with additional deformation elements in plan view after a side impact.

FIG. 8 shows the floor structure 1 of FIG. 3 with additional deformation elements 64, 66, 68, 70 in a plan view after a side impact, which was carried out by means of a test object in the form of a pile 72. Due to the impact the sill 16 was first of all deformed transverse to the direction of travel. Part of the energy of the impact can therefore already be absorbed by the deformation of the sill 16. In addition in particular the cross members 6, 8 and the deformation elements 68, 70 are deformed and crushed along their longitudinal axis. The deformation behaviour is in the case of the cross members 6, 8 decisively influenced by the crumple beads 6a, 6b, 6c, 6d and 8a, 8b, 8c, 8d. In this case principally the crumple beads in the vicinity of the impact, i.e. in the vicinity of the sill 16, are deformed and compressed at defined points due to the action of the force of the impact.

The deformation elements 68, 70 also deform principally in a defined region, which is characterised by a folded surface similar to that of a harmonica. The force acting transversely on the longitudinal member 12 can already be reduced in this way. The deformations of the sill 16, longitudinal member 12 and deformation elements 68, 70 compared to the non-deformed sill 18, longitudinal member 14 and the non-deformed deformation elements 64, 66 can easily be recognised.

It cannot be excluded however that, despite the deformation of sills 16, longitudinal member 12, cross members 6, 8 and the deformation elements 68, 70, a force is exerted on the accommodating means 2, 4, 6, 8, 10, 12, 14, 36, 36', 36" of the energy storage modules 62, 62', 62" in the region of the energy storage modules 62, 62', 62. In order in this case to avoid damage to the energy storage modules 62, 62', 62" in this instance the accommodating means particularly in the form of the cross members 4, 6, 8, 10 and the accommodating boxes 36', 36" convert energy of the impact into a deformation of these accommodating means. Thus, in addition the cross members 4, 6, 8 in this case, in particular the cross members 6, 8, experience a defined deformation between the energy storage modules 62', 62" on account of the deformation zones with defined deformation behaviour in the form of the crumple beads 4a, 6a, 8a and the accommodating boxes 36', 36" on account of the deformation zones with defined deformation behaviour in the form of the flanges 52', 52", 56". It can clearly be seen that the space between the energy storage modules 62' and 62" is now smaller than that between the energy storage modules 62 and 62', which are further removed from the impact.

Thus, damage to the energy storage modules 62, 62', 62" is prevented due to the deformation of the accommodating means 4, 6, 8, 36', 36" between the energy storage modules 62, 62'.

Figure 9A:
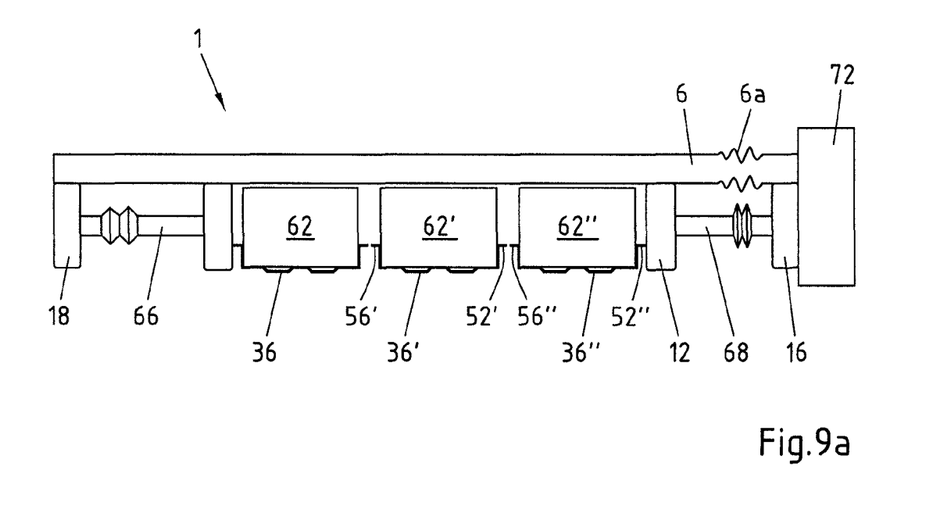
FIGS. 9a-b show the floor structure of FIG. 3 with additional deformation elements in a cross-sectional view during and after the side impact.

FIG. 9a shows the floor structure 1 of FIG. 3 with additional deformation elements 64, 66, 68, 70 in a cross-sectional view during the side impact. Due to the impact of the pile 72 on the sill 16 and the cross member 6, first of all the sill 16 is deformed transverse to the direction of travel. Part of the energy of the impact can thus already be absorbed by the deformation of the sill 16. As can also be seen in FIG. 8, inter alia the cross member 6 and the deformation element 68 is deformed or crushed along its longitudinal axis. At this point in time of the impact first of all the crumple beads 6a and the deformation element 68 are deformed in the vicinity of the impact, i.e. in the vicinity of the sill 16, and defined points are compressed due to the action of the force of the impact. The deformations of the cross member 6 in the region of the sill 16 and of the deformation element 68 compared to the non-deformed part of the cross member 6 in the region of the sill 18 and of the non-deformed deformation element 66 can easily be recognised.

Without deformation zones with defined deformation behaviour between the energy storage modules, then as the deformation progresses further a force would be exerted on the energy storage modules 62, 62', 62", as a result of which the energy storage modules 62, 62', 62" would be damaged.

Figure 9B:
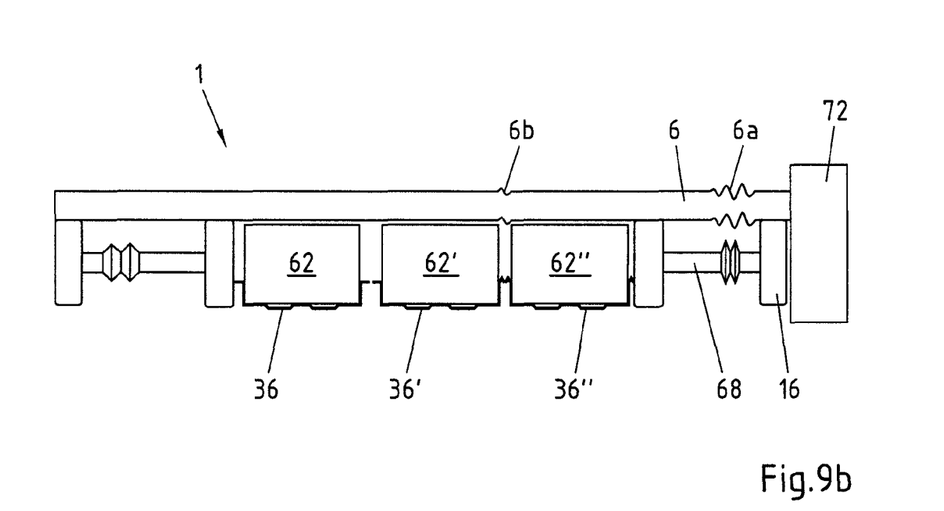

FIG. 9b shows the floor structure of FIG. 3 with additional deformation elements in a cross-sectional view after the side impact. The deformation elements and the cross member 6 in the region of the crumple bead 6a cannot be deformed any further. On account of the deformation zones with defined deformation behaviour between the energy storage modules 62', 62" in the form of the crumple bead 6b and the flanges 52', 52", 56", further impact energy can be dissipated without the energy storage modules 62, 62', 62" being damaged.

Figure 10A:
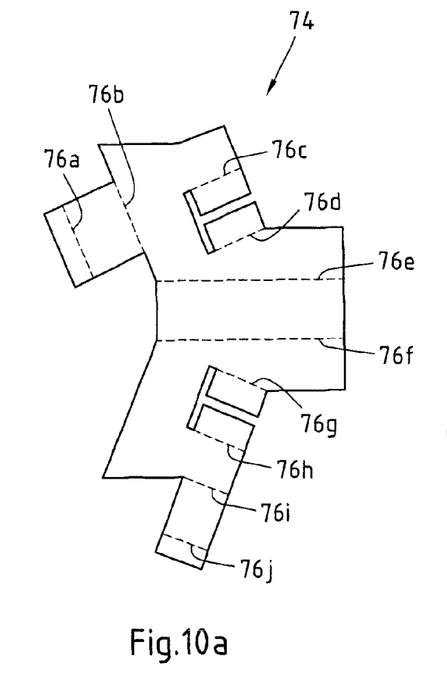
FIG. 10a shows an exemplary embodiment of a sheet cut to size for a connecting part in the form of a bent part.
Figure 10B:
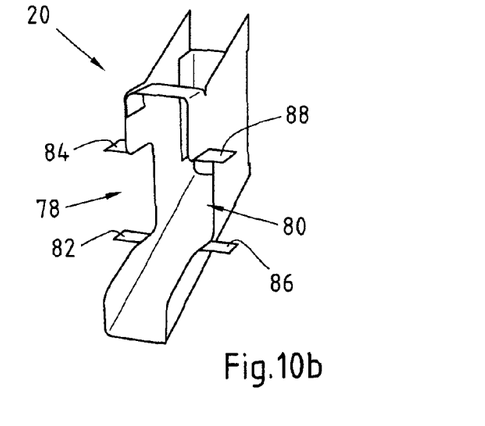
FIGS. 10b-c show an exemplary embodiment of a connecting part in the form of a bent part in various perspective views.
Figure 10C:
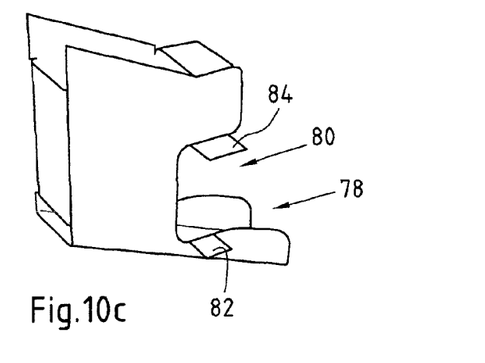

FIG. 10a shows an example of a sheet cut to size 74 for a connecting part in the form of a bent part 20, 22, 24, 26. Such a sheet cut to size can be cut into virtually any desired complex shape. By appropriate bending of the sheet cut to size 74 along the bent edges 76a to 76j a complex and stable connecting part in the form of a bent part 20 can be produced in a simple manner. Such a bent part 20 for the bent parts 20, 22, 24, 26 is illustrated by way of example in FIGS. 10*b* and 10*c* from different perspectives. By means of the recesses 78, 80 and the flanges 82, 84, 86, 88 such a bent part can connect the longitudinal member elements 28, 30, 32, 34 to the longitudinal members 12, 14 and the cross members 2, 10. Thus, with few material and production resources a stable connection can be produced at the intersection point of various members and stable ties of further elements are possible.

Figure 11A:
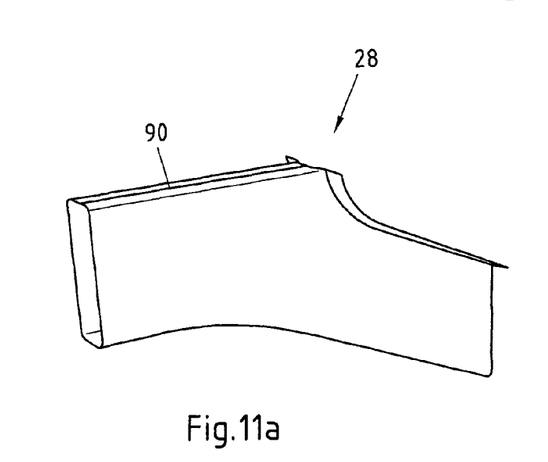
FIGS. 11a-b show an exemplary embodiment of a front longitudinal member element in various perspective views.
Figure 11B:
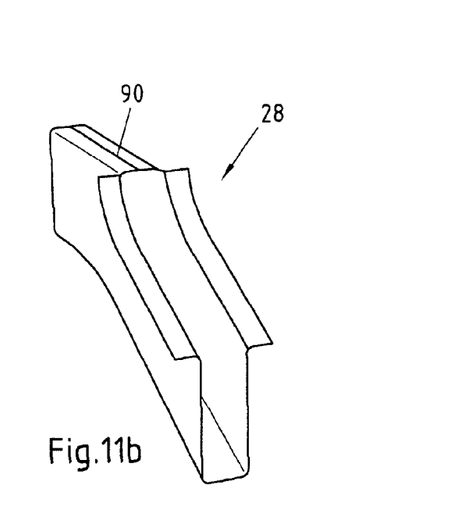

Finally, FIGS. 11*a-be* show an example of a front longitudinal member element 28 in various perspectives. The longitudinal member elements 28, 30, 32, 34 are however formed substantially identically, so that the illustrated longitudinal member element is representative of the longitudinal member elements 28, 30, 32, 34. Due to an identical formation the production of a floor structure in particular can be simplified, without adversely affecting the accident behaviour especially in the case of front and rear impacts. Due to the use of hollow profiles a sufficient stability of the longitudinal member elements can be ensured and due to the longitudinal formation a sufficient deformation zone can be provided. The longitudinal member elements 28, 30, 32, 34 are produced by U-O forming and shaping, in which they are bent from a sheet to form an at least partially closed hollow profile. Due to a weld seam 90 produced for example by laser welding, the longitudinal member element 28 becomes a permanently closed hollow profile.

The invention claimed is:

1. Floor structure for a vehicle comprising accommodating means for at least two energy storage modules, wherein the accommodating means comprise at least two longitudinal members and at least two cross members, and wherein the accommodating means comprise at least one deformation zone with defined deformation behaviour between the energy storage modules, wherein the at least one deformation zone is provided by at least one cross member.

2. Floor structure according to claim 1, wherein the floor structure comprises at least one accommodating box.

3. Floor structure according to claim 2, wherein the at least one accommodating box comprises embossings for stiffening purposes.

4. Floor structure according to claim 2, wherein the at least one accommodating box is connected to at least one cross member.

5. Floor structure according to claim 2, wherein at least two accommodating boxes are provided and these have a substantially rectangular shape and run parallel to the longitudinal members.

6. Floor structure according to claim 2, wherein the edges of the side walls of the accommodating boxes have flanges.

7. Floor structure according to claim 1, wherein the floor structure additionally comprises one sill.

8. Floor structure according to claim 1, wherein further deformation zones with defined deformation behaviour between the energy storage modules are provided by at least one accommodating box and/or by at least one longitudinal member.

9. Floor structure according to claim 7, wherein at least one cross member in the region between a longitudinal member and a sill comprises a deformation zone with defined deformation behaviour.

10. Floor structure according to claim 7, wherein the floor structure comprises at least one deformation element with defined deformation behaviour between the longitudinal members and sills.

11. Floor structure according to claim 7, wherein the sills are connected by at least one cross member formed in one piece.

12. Floor structure according to claim 1, wherein the longitudinal members are connected by at least one cross member formed in one piece.

13. Floor structure according to claim 1, wherein at least one longitudinal member, has a front longitudinal member element and a rear longitudinal member element.

14. Floor structure according to claim 13, wherein the longitudinal member elements are connected via connecting parts to the longitudinal member.

15. Floor structure according to claim 13, wherein the longitudinal member elements are formed geometrically substantially identically.

16. Floor structure according to claim 13, wherein the longitudinal member elements are produced by U-O-forming/shaping.

17. Use of a floor structure according to claim 1 in a motor vehicle with an electric and/or internal combustion engine.

18. Floor structure according to claim 1, wherein the floor structure comprises an accommodating box for each energy storage module.

19. Floor structure according to claim 2, wherein the at least one accommodating box is connected to at least one cross member by means of at least one embossed part.

20. Floor structure according to claim 1, wherein the floor structure additionally comprises two sills.

* * * * *